United States Patent
Wang et al.

(10) Patent No.: US 8,374,625 B2
(45) Date of Patent: Feb. 12, 2013

(54) NEIGHBORHOOD PAGING GROUP DESIGN FOR WIRELESS NETWORKS

(75) Inventors: Xiaoyi Wang, Beijing (CN); Xin Qi, Beijing (CN); Shashikant Maheshwari, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 679 days.

(21) Appl. No.: 12/555,926

(22) Filed: Sep. 9, 2009

(65) Prior Publication Data

US 2010/0081454 A1  Apr. 1, 2010

Related U.S. Application Data

(60) Provisional application No. 61/095,604, filed on Sep. 9, 2008.

(51) Int. Cl.
*H04W 24/00* (2009.01)

(52) U.S. Cl. ............ 455/456.1; 455/458; 455/509; 455/422; 455/435; 455/515; 455/434; 455/466; 455/410; 370/315; 370/331; 370/312; 370/256; 370/252; 370/328

(58) Field of Classification Search .............. 455/458, 455/509, 422.1, 435.1, 226.3, 456.1, 515, 455/567, 434, 466, 410; 370/315, 331, 312, 370/256, 252, 328, 338, 329
See application file for complete search history.

(56) References Cited

U.S. PATENT DOCUMENTS

| | | | |
|---|---|---|---|
| 5,898,923 A | 4/1999 | Gaasvik et al. | |
| 7,761,591 B2 * | 7/2010 | Graham | 709/233 |
| 8,280,401 B2 * | 10/2012 | Na et al. | 455/456.1 |
| 2002/0077930 A1 * | 6/2002 | Trubey et al. | 705/26 |
| 2007/0143398 A1 * | 6/2007 | Graham | 709/204 |
| 2010/0035633 A1 * | 2/2010 | Park et al. | 455/456.1 |
| 2010/0223386 A1 * | 9/2010 | Kokusho et al. | 709/226 |
| 2011/0167360 A1 * | 7/2011 | Aitken et al. | 715/760 |
| 2011/0292856 A1 * | 12/2011 | Park et al. | 370/311 |

OTHER PUBLICATIONS

Hamiti, Shkumbin, "The Draft IEEE 802.16m System Description Document", IEEE 802.16 Broadband Wireless Access Working Group; IEEE 802.16m-08/003r4 (Jul. 29, 2008), pp. 1-89.

* cited by examiner

*Primary Examiner* — Joseph Arevalo

(57) ABSTRACT

Various example embodiments are disclosed. According to an example embodiment, a technique may include storing, by a mobile station while in an active state, a neighborhood paging list, transitioning from active state to idle state, receiving a paging group ID from a local base station, determining that the paging group ID received from the local base station does not match any of the paging group IDs on the mobile station's neighborhood paging list, performing location update, updating the neighborhood paging list based on information received from the local base station, the updated neighborhood paging list including a paging group ID (PGID) identifying a local paging area corresponding to the local base station and a list of neighbor paging group IDs identifying one or more paging areas that are neighbors to the local paging area.

14 Claims, 13 Drawing Sheets

NEIGHBORHOOD PAGING GROUP DESIGN FOR WIRELESS NETWORKS

CROSS-REFERENCE TO RELATED APPLICATION(S)

This application claims priority to U.S. Provisional patent application Ser. No. 61/095,604 filed on Sep. 9, 2008, entitled "Neighborhood Paging Group Design For Wireless Networks," hereby incorporated by reference in its entirety.

TECHNICAL FIELD

This description relates to wireless networks.

BACKGROUND

In some wireless networks, mobile stations may operate in an active state, in which the mobile station (MS) may transmit and receive data. Some mobile stations may also operate in an idle state in which the communications hardware for the MS may be placed into a low power or off state to conserve power. While in idle state, the MS may be either in a paging unavailable mode in which paging messages may not be received, or in a paging available mode where the MS may receive paging messages. The base station (BS) may send a paging message to notify the MS that the MS has data to be delivered to the MS. At various times, the MS will transition from paging unavailable mode to paging available mode to: 1) to receive a paging group identifier (PGID) of a local base station to determine if the MS has moved outside a specific paging area. If the MS has moved outside a specific paging area, the MS may perform network re-entry or a location update procedure with the new BS to notify the network of the MS's new location. And, 2) to receive the paging message, which may indicate if the BS has data to be delivered to the MS. If there is data to be delivered to the MS, the MS may transition to active state, perform network re-entry and receive the data.

In some cases, there may be a trade off between paging area size and location update frequency. A larger paging area may create larger paging overhead to send a large number of paging messages, but less frequency location updates being required by MSs. Whereas, a smaller paging area may decrease paging overhead, but may increase the location update burden on mobile stations.

SUMMARY

According to an example embodiment, a method may include storing, by a mobile station, a neighborhood paging list that includes a paging group ID (PGID) that identifies a last active paging area where the mobile station was last in an active state and a list of neighbor paging group IDs identifying one or more paging areas that are neighbors to the last active paging area, transitioning from an active state to an idle state, transitioning from a paging unavailable mode to a paging available mode, receiving a paging group ID from a local base station, comparing the paging group ID received from the local base station to the mobile station's neighborhood paging list. The method may also include returning to the paging unavailable mode if the paging group ID from the local base station matches one of the paging group IDs on the neighborhood paging list, and performing the following if the received paging group ID from the local base station does not match one of the paging group IDs on the neighborhood paging list: performing a location update with the local base station; and updating the neighborhood paging list based on information received from the local base station, the updated neighborhood paging list including a paging group ID (PGID) identifying a local paging area corresponding to the local base station and a list of neighbor paging group IDs identifying zero or more paging areas that are neighbors to the local paging area.

According to another example embodiment, a method may include storing, by a mobile station while in an active state, a neighborhood paging list; transitioning from active state to idle state; receiving a paging group ID from a local base station; determining that the paging group ID received from the local base station does not match any of the paging group IDs on the mobile station's neighborhood paging list; and, updating the neighborhood paging list based on information received from the local base station, the updated neighborhood paging list including a paging group ID (PGID) identifying a local paging area corresponding to the local base station and a list of neighbor paging group IDs identifying one or more paging areas that are neighbors to the local paging area.

According to an example embodiment, a method of performing two-step paging in a wireless network may include receiving, at a mobile station at a wireless network, a message that assigns one of a plurality of neighborhood paging group IDs as an anchor paging group ID for the mobile station; receiving an anchor paging message that identifies zero or more anchor paging group IDs; determining that the anchor paging group ID for the mobile station matches one of the paging group IDs of the anchor paging message; receiving a paging message associated with the anchor paging group ID for the mobile station; determining that the paging message identifies the mobile station; and performing the following in response to determining that the paging message identifies the mobile station: performing network re-entry; and receiving data addressed to the mobile station.

According to another example embodiment, a method of performing two-step paging in a wireless network may include: receiving, at a mobile station, an anchor paging group ID for the mobile station; receiving an anchor paging message that identifies one or more anchor paging group IDs; comparing the anchor paging group ID for the mobile station to the anchor paging message; decoding a paging message associated with the anchor paging group ID for the mobile station only if the anchor paging message includes the anchor paging group ID for the mobile station; determining that the paging message identifies the mobile station; and performing the following in response to determining that the paging message identifies the mobile station: performing network re-entry; and receiving data addressed to the mobile station.

According to another example embodiment, a method may include: transmitting, from a base station in a wireless network an anchor paging message that identifies one or more anchor paging group IDs, wherein each anchor paging group ID is associated with a different paging offset that identifies a location or resources of a paging message associated with the anchor paging group ID; transmitting a paging message for each anchor paging group ID identified in the anchor paging message at a time or via resources associated with the anchor paging group ID; and transmitting data to one or more mobile stations that are identified in each paging message.

According to another example embodiment, a method may include transmitting, from a base station, a base station ID (BSID) to identify the base station, wherein a portion of the BSID is or provides a paging group ID (PGID) that identifies a paging group for the base station.

According to another example embodiment, a method may include receiving, at a mobile station from a base station, a base station ID (BSID) to identify the base station, wherein a portion of the BSID is or provides a paging group ID (PGID) that identifies a paging group for the base station; comparing at least the paging group ID portion of the BSID to a neighborhood paging list; and performing location update if the paging group ID portion does not match the neighborhood paging list.

The details of one or more implementations are set forth in the accompanying drawings and the description below. Other features will be apparent from the description and drawings, and from the claims.

DETAILED DESCRIPTION

Figure 1:
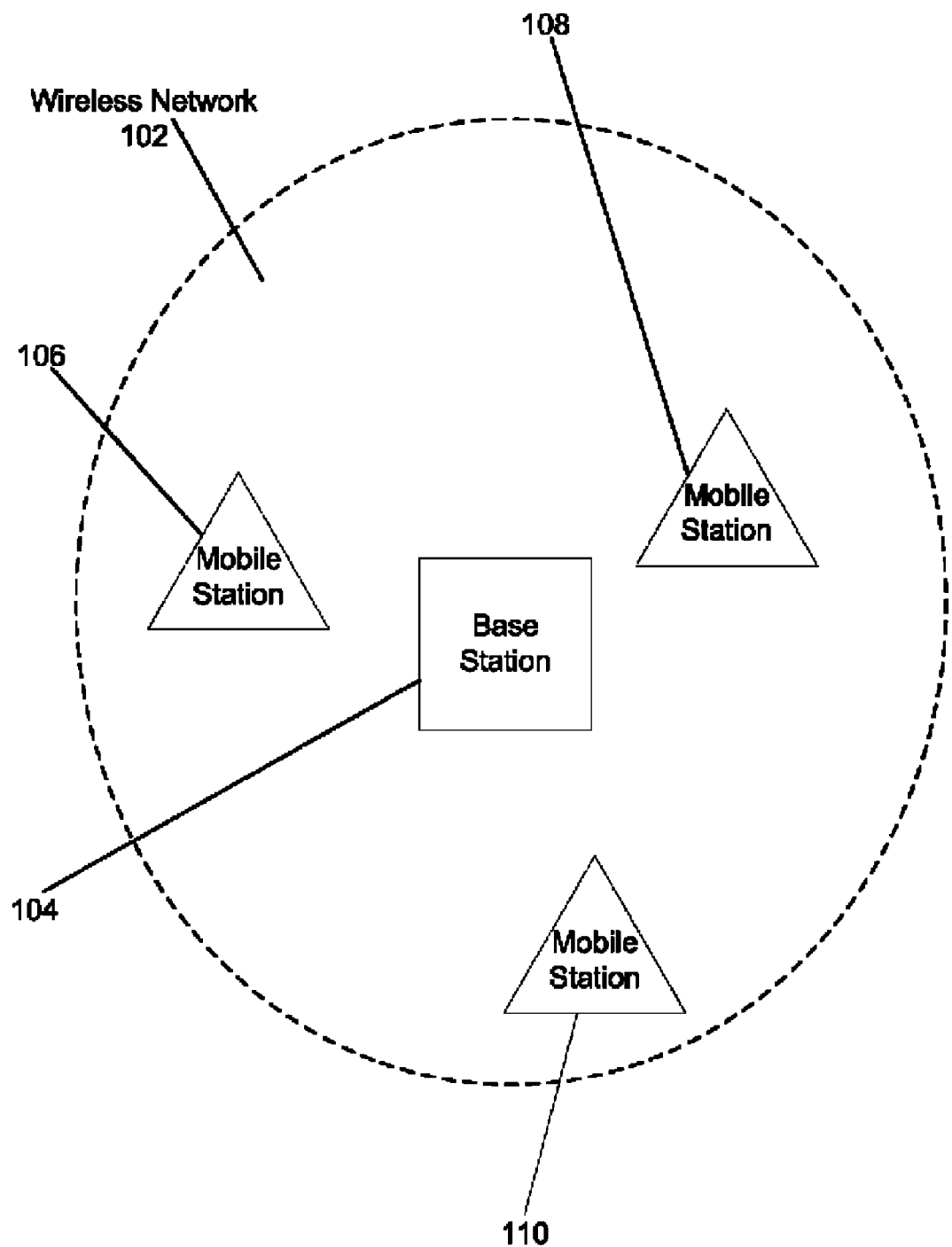
FIG. 1 is a block diagram of a wireless network according to an example embodiment.

FIG. 1 is a block diagram of a wireless network 102 including a base station 104 and three mobile stations 106, 108, 110 according to an example embodiment. While only three mobile stations are shown, any number may be provided. Although not shown, mobile stations 106, 108 and 110 may be coupled to base station 104 via relay stations or relay nodes, for example. The wireless network 102 may include, for example, an IEEE 802.16 Worldwide interoperability for Microwave Access (WiMAX) network, an IEEE 802.11 Wireless Local Area Network (WLAN) network, a cellular telephone network, or other wireless network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" (or "wireless station") may include any type of wireless node, such as base stations, mobile stations, relay stations, etc. While the present disclosure may use some of the terminology of WiMAX or other wireless standards or specifications, the present disclosure may be applicable to any networking or wireless technologies. Base station (BS) 104 may transmit information (e.g., either broadcast, multicast or unicast) in a downlink (DL) direction to each mobile station (MS) 106, 108, 110, and each MS 106, 108, 110 may transmit information to the BS 104 in an uplink (UL) direction.

Figure 2:
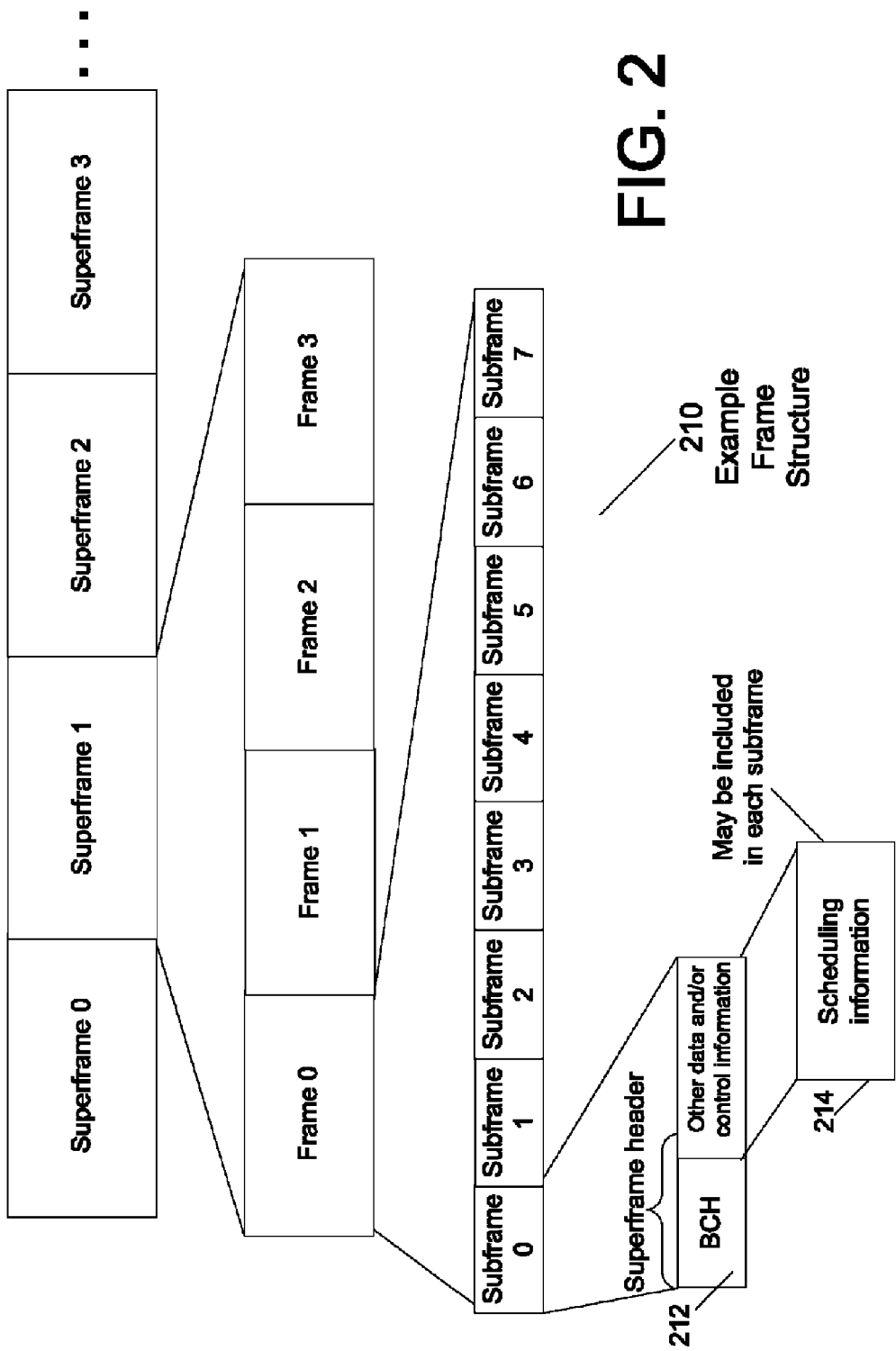
FIG. 2 is a diagram illustrating a frame structure according to an example embodiment.

FIG. 2 is a diagram illustrating a frame structure 210 according to an example embodiment. As shown in FIG. 2, several superframes are shown, including superframe 0, superframe 1, superframe 2, superframe 3, . . . . Each superframe may include a number of frames, such as, for example, four frames per superframe. Each frame may include a number of subframes, such as, for example, eight subframes per frame. For example, as shown, frame 1 may include eight subframes, such as subframes 0-7. Thus, according to an example embodiment, a superframe may include 32 subframes, although any number of subframes may be used. Each subframe may include transmission resources, such as, for example, a number of Orthogonal Frequency Division Multiplexing (OFDM) symbols, e.g., across one or more subcarriers. For example, each subframe may include 5-7 OFDM symbols (or other number of OFDM symbols), depending on a type of the subframe. These are merely examples, and a subframe may include any number of resources or OFDM symbols.

In an example of TDD (Time Division Duplexing), one carrier frequency may be used for both DL and UL communication with the MS, where each subframe may be allocated by BS 104 for either DL transmission or UL transmission. The DL/UL ratio for subframes within a frame may vary, based on control information indicated or transmitted by the BS 104. For example, the DL/UL ratio may be 4/4 (meaning, the frame includes 4 DL subframes followed by 4 UL subframes), may be 5/3, or 3/5 or other ratio, depending on the UL and DL traffic in the network. For example, one or more DL subframes may occur first in a frame for the BS 104 to transmit broadcast and unicast information to MSs, followed by one or more UL subframes that may allow one or more of the MSs opportunities or resources to transmit UL to the BS 104. In an example of FDD (Frequency Division Duplexing), two carrier frequencies may be used, where one carrier frequency may be used for DL communication with the MS, while the other carrier frequency may be used for UL communication with the MS. In FDD, all the sub-frames for DL carrier frequency may be used for DL communication while all the sub-frames for UL carrier frequency may be used for UL communication, according to an example embodiment.

Referring to FIG. 2 again, the first subframe (subframe 0 in FIG. 2) of each superframe is typically allocated for downlink transmission. Each superframe may include a superframe header (SFH) that is included in the first subframe of the superframe (subframe 0) of the first frame (frame 0) of the superframe. The SFH may include a number of fields, including a broadcast channel (BCH) 212. The BCH 212 may be used by the BS 104 to broadcast to all MSs or provide essential system parameters and system configuration information 214. The BCH 212 may include a primary broadcast channel (PBCH) and a secondary broadcast channel (SBCH). The PBCH may carry deployment wide (or network wide) common information from the BS, while the SBCH may carry sector specific information, where MSs in wireless network 102 may be divided into different sectors. In an example embodiment, the BCH 212 may be frequency division multiplexed with data within the same subframe (subframe 0).

As noted, BCH 212, e.g., provided within a first subframe of a superframe, may include system configuration information 214. System configuration information 214 may include or describe the system configuration of one or more (or each) of the subframes of a superframe. In some cases, the system configuration information 214 may be considered essential for decoding subframes. System configuration information 214 may include, for example, DL/UL ratio for subframes within the superframe (e.g., first 5 subframes are for DL, and last 3 subframes are for UL), subframe concatenation pattern for a superframe, the configuration information of localized resource allocations (LRAs) and distributed resource allocations (DRAs) within a subframe (which may allocate resources for UL or DL transmissions), permutation method for subcarriers, and/or other system configuration information.

As shown in FIG. 2, each subframe may include other data and control information. Although, FIG. 2 only shows the other data and control information for subframe 0, each subframe may include other data and control information. For example, each subframe may include scheduling information that may schedule, assign or allocate resources to each of the MSs for UL or DL transmissions. The scheduling information in a subframe may allocate or assign resources to a MS for the same subframe, or a future subframe, as examples.

In an example embodiment, the scheduling information may be provided in (or as part of) a unicast service control channel or a Map message. These are merely some examples, and the scheduling information may be provided in a number of different formats, or may be known by different names. The scheduling information may include, for example, MS-specific (e.g., user-specific or connection-specific) scheduling assignments to assign or allocate UL or DL resources to different MSs. The scheduling assignments may be for unicast transmissions (either uplink or downlink), or DL multicast or broadcast transmissions (e.g., where a MS may be a member of one or more multicast groups).

For example, the MS-specific scheduling information that identifies UL resources for a MS may identify UL resources (e.g., time slot and/or subcarriers or other resources) assigned or allocated to the MS to allow the MS an opportunity to transmit UL to the BS, e.g., in a same or different subframe of the same frame or a next frame, as examples. Similarly, the MS-specific scheduling information that assigns DL resources to a MS may identify resources (e.g., time slot and/or subcarriers) within a current subframe or a future subframe (e.g., next subframe) for which the BS will transmit data to the MS.

Figure 3:
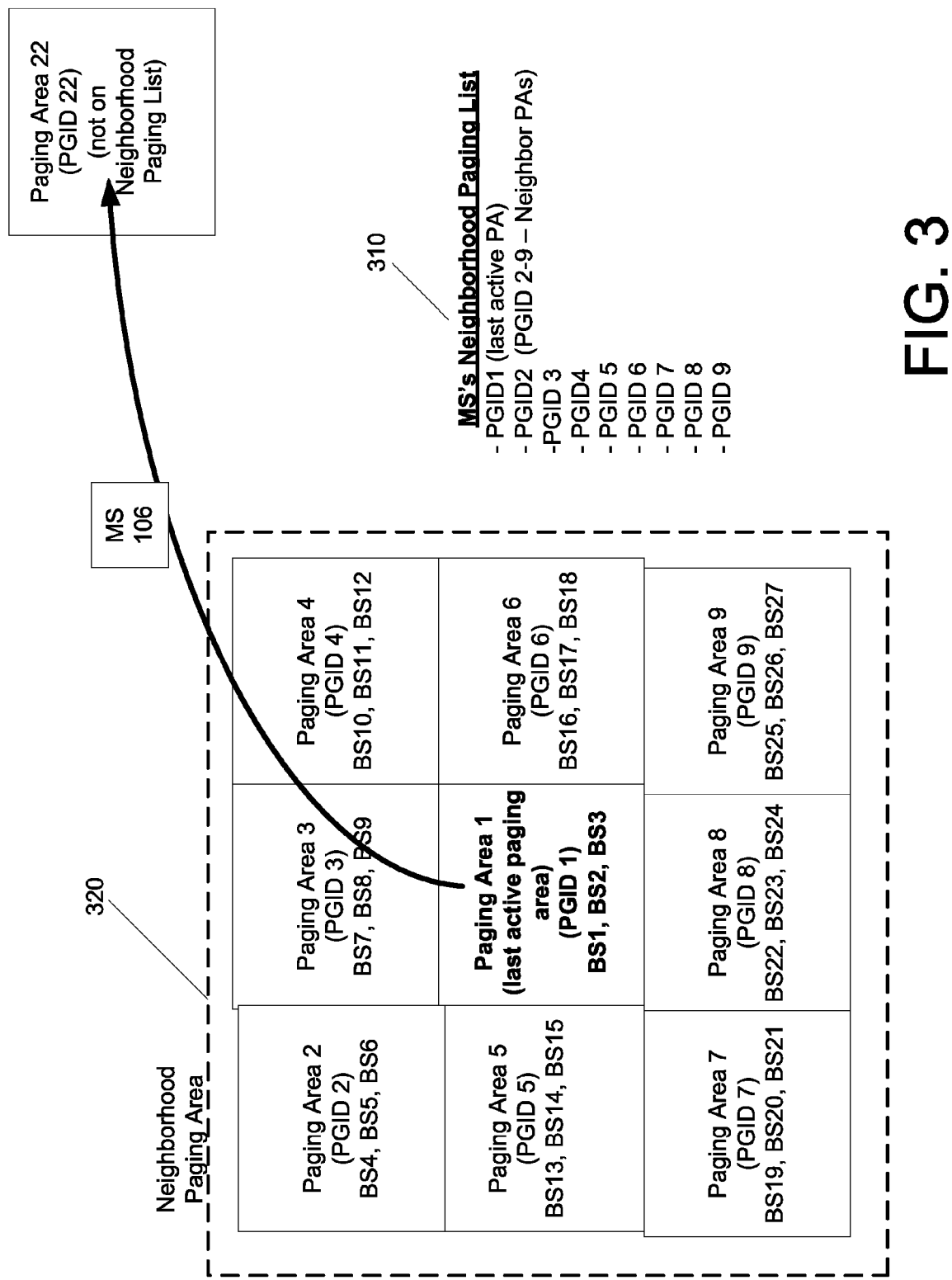
FIG. 3 is a block diagram illustrating use of a neighborhood paging list according to an example embodiment.

FIG. 3 is a block diagram illustrating use of a neighborhood paging list according to an example embodiment. As shown in FIG. 3, multiple paging areas are shown, each paging area (PA) including a paging group of multiple base stations, e.g., 3 to 7 BSs, although any number may be used. A paging area may also refer to a location area, tracking area or registration area, or other area, for example. For example PA1 may include a paging group that includes BS1, BS2 and BS3, and identified by a paging group identifier PGID1; PA2 may include a paging group that includes BS4, BS5 and BS6, and identified by PGID2; PA3 may include a paging group that includes BS7, BS8 and BS9, and identified by PGID3; PA4 may include a paging group that includes BS10, BS11 and BS12, and identified by PGID4; PA5 may include a paging group that includes BS13, BS14 and BS15, and identified by PGID5; PA6 may include a paging group that includes BS16, BS17 and BS8, and identified by PGID6; PA7 may include a paging group that includes BS19, BS20 and BS21, and identified by PGID7; PA8 may include a paging group that includes B22, BS23 and B24, and identified by PGID8; PA9 may include a paging group that includes BS25, BS26 and B27, and identified by PGID9, etc., and finally PA22 may include a paging group that includes several base stations, and identified by PGID22. Although not shown in FIG. 3, other paging areas/PGIDs may be provided. FIG. 3 merely illustrates some example paging areas and paging groups, and the disclosure is not limited thereto, and although paging areas are shown as square shape as a simple example for illustrative purposes, the paging areas may actually be any shape, such as round, etc.

A mobile station (MS) 106 may initially be located within Paging Area (PA) 1, e.g., which may include a geographic region that includes (or includes the transmission range of) one or more base stations, such as base stations BS1, BS2 and BS3. According to an example embodiment, each BS may belong to one paging group (within a paging area). In this manner, the BS may need to transmit only one PGID (paging group identifier) that identifies (or may be associated with) the paging area/paging group, rather than transmitting multiple PGIDs to which it belongs. Each BS may transmit its PGID, e.g., within the broadcast control channel (BCH), other broadcast channel, or other time or location. For example, each BS may transmit its PGID (paging group identifier) as part of a paging message, or in other channel or message. For example, each BS may transmit its PGID every, say, 20 ms, as an example.

Each BS may also transmit (e.g., broadcast or unicast), from time to time, a list of neighbor paging group IDs identifying one or more paging areas that are neighbors of (e.g., adjacent or bordering) the transmitting BS, or that identify neighbor paging areas to the paging area to which the transmitting BS belongs. In other words, each BS may transmit a list of neighbor paging group IDs that identify zero or more (or even all of) neighbor paging areas to the paging area for the transmitting base station. In a case where there are zero paging group IDs in the list of neighbor paging group IDs then the BS typically may not transmit this message, and the BS instead may provide an indication that this BS does not have any neighbor PGIDs/paging areas. In an example embodiment, although not required, the neighbor paging group ID list may also include the PGID to which the BS belongs (e.g., identifying the center paging area of the neighborhood), thus, identifying all PAs in the neighborhood (e.g., the center PA to which the BS belongs and the neighboring or surrounding PAs).

Thus, as shown in FIG. 1, MS 106 may initially be in communication with BS1, and may be within paging area 1, which is identified by PGID1. BS1, BS2 and BS3 each may transmit PGID1 to identify the paging group or paging area which the BS belongs (paging group PGID1, and paging area 1). During a setup for idle mode (which may be preparation for the MS to transition from active state to an idle state), or during a location update procedure where the MS may perform network re-entry or a ranging procedure to notify the network of the MS's new location, or at any other time, the MS may receive a list of neighbor paging group IDs, which identifies zero or more (or even all) of the paging areas that border the paging area that the MS is currently located. For example, MS 106, while within paging area 1, may receive from BS1, a list of neighbor paging group IDs that identify the neighbor paging areas or neighbor paging groups to paging area 1/PGID1. Thus, for example, as shown in FIG. 3, paging area 1 may include a number of neighbor paging areas, such as paging areas 2-9. Paging area 1 is shown in the center of the neighborhood, with the neighbor paging areas adjacent to or surrounding the paging area 1, including paging areas 2, 3, 4, 5, 6, 7, 8 and 9. The paging area 1 and its neighbor paging areas may be referred to as a neighborhood paging area 320, which includes paging areas 1-9, in this example.

In response to receiving the list of neighbor paging group IDs and receiving the paging group ID of the current paging area where the mobile station is located and operating in an active state, the MS may generate and store a neighborhood paging list 310 that describes or identifies the neighborhood paging area 320. The neighborhood paging list 310 may include a PGID that identifies a current paging area where the MS is currently located (PGID1 in this example). In an example embodiment, the neighborhood paging list 310 may, for example, identify the last active paging area (PGID1 in FIG. 3), where the mobile station was last in an active state (or last performed location update), since the neighborhood paging list 310 typically will not, for example, be updated until the MS is operating again in active state or perform location update in new paging group whose PGID does not match with the PGIDs stored in MS's neighborhood paging list 310 of group IDs. The neighborhood paging list 310 may also include a list of neighbor paging group IDs identifying one or more paging areas that are neighbors to the last active paging area (PGID 1). Thus, as shown in FIG. 3, the MS's neighborhood paging list 310 may include the PGID identifying a last active paging area (PGID1 in this example), and the neighbors (neighbor paging areas) of the last active paging area (including PGIDs 2-9).

Thus, each neighborhood paging list (e.g., 310) may include a neighborhood paging 320 area that may include a central (or centrally located) paging area (paging area 1 in this example) that may be, for example, the last active paging area for the MS (e.g., paging area 1 identified by PGID1), and zero or more neighbor paging areas (e.g., paging areas 2-9, identified by PGID 2-9, respectively). In an example embodiment, the neighborhood paging list 310 may be provided to and used by all MSs within the corresponding (last active) paging area. Each of these MSs (which last performed a location update while in paging area 1, for example) may maintain this same neighborhood paging list 310 while the MS may move within the neighborhood paging area 320. E.g., movement of the MS within the neighborhood paging area 320, as reflected in the MS neighborhood paging list 310, does not cause the MS to perform a location update, and thus, the MS may maintain the same neighborhood paging list while located within the neighborhood paging area 320. Thus, each neighborhood paging list may be a paging area-specific neighborhood paging list (e.g., a different neighborhood paging list for each paging area), and the neighborhood paging list may typically be the same for all MSs located within a particular paging area, according to an example embodiment. Thus, the neighborhood paging list 310 may be provided by all of the BSs within paging area 1 (e.g., BS1, BS2, BS3), and used by all MSs that are entering in idle mode within paging area 1, for example. Thus, in this example, neighborhood paging list may be considered to be specific to paging area 1, e.g., describing a neighborhood paging area 320 for paging area 1. Different paging areas will have different neighborhood paging lists, for example.

As noted above, a BS may transmit the PGID that identifies the paging area to which it belongs, e.g., every 20 ms, and may transmit a neighbor paging group ID list (identifying its neighbor PAs) every 1 to 2 seconds, for example (a longer period). Thus, fewer resources may be required to transmit one PGID frequently, and a neighbor paging group ID list less frequently, as compared to the BS belonging to multiple paging groups and frequently transmitting multiple PGIDs, for example. Thus, it may decrease the signaling overhead if the BS belongs to only one paging area, thus requiring the BS to transmit only one PGID at such time, and transmit the list of neighbor paging group IDs less frequently, according to an example embodiment. Thus, for example, the BS belonging to one PGID, and transmitting a larger neighbor paging group ID list may reduce signaling overhead, since this neighbor paging group ID list may be transmitted less frequent that the BS's paging group ID, for example.

Further details regarding the operation of mobile station 106 will now be described with reference to FIG. 3. For example, initially, MS 106 may be in an active state and connected with or in communication with BS1 of paging area 1/PGID1. MS 106, as described above, may store a neighborhood paging list 310, based on information received from BS1, e.g., while the MS 106 is in an active state and located within paging area 1. For example, the MS 106 may receive the list of neighbor paging IDs (e.g., listing the neighbors to paging area 1/PGID 1) in response to a location update procedure or unicast by BS when MS is entering in idle mode or perform network re-entry because of location update or request from the MS or as part of idle setup for the MS 106 (preparing the MS 106 to enter idle state from active state). The MS 106 may also receive the PGID that identifies paging area 1 (e.g., PGID1). This information may be stored by MS 106 as the MS's neighborhood paging list 310.

Location update procedure may include, for example, by performing network re-entry with BS1, for example. This may include the MS 106 sending a ranging request to the BS1, specifying "location update" to notify the BS1 that the MS is now present in its network or cell. The BS may send a ranging response, and the exchange of ranging request and ranging response messages may continue as part of a ranging procedure that may allow the MS and BS to exchange parameters, capabilities, and other information that may be used to set up wireless service or a connection between the MS 106 and BS1.

According to an example embodiment, the MS can be paged anywhere within the neighborhood paging area 320 when the MS 106 travels within the neighborhood paging area 320 (which is the group of paging areas identified by the MS's neighborhood paging list. Thus, all paging messages directed to or sent to the MS 106 may be transmitted by the base stations within paging areas 1-9, which allows the MS 106 to receive such paging messages, regardless where the MS 106 travels within the neighborhood paging area 320. Also, while the MS 106 is located within the neighborhood paging area 320 (area identified by the neighborhood paging list 310), the MS does not need to perform a location update.

While in idle state, as an example, the MS 106 typically does not transmit or receive data, and does not perform handover between base stations, although the MS may move between cells or networks within the neighborhood paging area 320. While in idle state, paging may be used to notify the MS that the BS has data to transmit to the MS. While in idle state, the MS 106 may be in a low power or sleep mode, referred to as paging unavailable mode, where the MS is not receiving messages or paging messages, for example. Also, the MS 106 may move, even while in idle state, e.g., from paging area 1 to paging area 4. From time to time, the MS 106 will transition from paging unavailable mode to paging available mode. While in paging available mode the MS 106 may 1) determine whether the MS 106 has moved outside the neighborhood paging area, and if so, then the MS may perform a location update and network re-entry with the new BS. And if the MS has not moved outside the neighborhood paging area 320, then the MS may 2) receive or decode the paging message, and determine whether the BS has data to be transmitted to the MS (e.g., based on a MAC address or MS paging identifier in the paging message that identifies or corresponds to the MS). If the paging message identifies the MS 106, then the MS may, according to an example embodiment, enter active state, perform network re-entry with the new BS including sending a ranging request with reason "Response to Page", and then receive the data from the BS. Other example embodiments for performing paging, including the use of an Anchor paging group are described in greater detail below.

With respect 1) determining whether the MS 106 has moved beyond the neighborhood paging area, the MS 106 may, from time to time, transition from paging unavailable mode to paging available mode, and receive and decode a PGID from a BS, e.g., via a BCH or other message or channel of a frame transmitted by the new or local BS. The MS 106 may then compare the paging group ID of the new BS to the MS's neighborhood paging list 310. If the paging group ID of the new BS matches one of the PGIDs on the neighborhood paging list 310, this indicates that the MS 106 is still located within the neighborhood paging area 320, and no location update is performed by the MS at that time. According to an example embodiment, the MS 106 may then transition back to paging unavailable mode. For example, if the received PGID is PGID4, this will match the neighborhood paging list 310 and indicates that the MS 106 is within paging area 4.

However, if the received paging group ID received from the new BS does not match any of the PGIDs of the neighborhood paging list 310, this indicates that the MS 106 is located outside the neighborhood paging area 320. For example, if MS 106 receives PGID22 (which does not match any of the PGIDs on the neighborhood paging list 310) from BS 101, this indicates that the MS is in paging area 22, and is outside the neighborhood paging area 320. In an example embodiment, the MS 106 may then transition from idle state to active state, and perform location update procedure with BS 101. This may include, for example, among other things, the MS sending a ranging request to the new BS 101, with reason set to "location update." This will notify the network, via BS 101, that the MS 106 has moved to paging area 22, and the MS will be registered at its new location, for example.

After performing network re-entry, the MS 106 may update its neighborhood paging list 310 based on information received from BS 22. For example, the MS 106 may receive the PGID (PGID22) for the new BS22, and may receive from BS22 a list of neighbor paging group IDs identifying one or more paging areas/paging groups that are neighbors to the paging area 22/PGID22. For example, the MS may receive from the new BS, a neighbor paging ID advertisement message (e.g., MOB_NBR_PGID_ADV) that includes neighbor PGIDs that identify neighbor paging areas of the paging area/paging group (PGID22) to which the current BS belongs. Thus, the MS 106 may then store an updated neighborhood paging list 310A (not shown) that includes the paging group ID to which the current (or new) base station (BS22) belongs, as well as PGIDs identifying neighbor paging areas/paging groups for paging area 22/PGID22.

In an example embodiment, the MS's neighborhood paging list 310 may not be updated until the next time the MS 106 enters active state and performs location update, e.g., with a BS that is outside the current neighborhood paging area 320, as done for paging area 22. This means that, for example, no changes are made to the neighborhood paging list 310 as MS 106 moves around within the neighborhood paging area 320. In an example embodiment, only when the MS receives a PGID that is not on the current neighborhood paging list (indicating that the MS is located outside the neighborhood paging area 320) does the MS perform location update and generate an updated neighborhood paging list based on the new BS, and the new neighbor paging areas of the new BS. Thus, according to an example embodiment, the paging group ID where the MS was located at the time the MS was last in active state and updated its neighborhood paging list may be referred to as the last active paging area, which may be the paging area where the MS was last active, e.g., paging area 1 (PGID1) initially. After movement to paging area 22, this last active paging area, that is included in the neighborhood paging list 310, is the paging area 22/PGID22, as an example.

Thus, according to an example embodiment, the MS may be approximately in the center of a (new) neighborhood paging area 320 when the MS performs location update, since the neighborhood paging area 320 for the MS may include, for example, a current paging area (or paging area where MS is located) and the neighbor paging areas around the current paging area. Later, if the MS moves to a location outside the current neighbor paging area, a location update may be performed with a new base station, causing the MS to store an updated neighborhood paging list 310, where the MS will again be relatively centered in the updated neighborhood paging area, centered at approximately the current paging area for the MS (where the MS currently is located). By centering the MS in the neighborhood paging area, this may decrease the amount of location updates that may typically occur as the MS 106 moves around, for example.

In some cases, the paging (and paging message processing) overhead may be significant. For example, if every MS is required to receive and decode every paging message, even though most mobile stations will not be identified in any particular paging message, for example, this may create a significant processing burden on mobile stations.

Therefore, according to an example embodiment, a two-step paging process may be employed in which an anchor paging group ID may be assigned to each mobile station. Or example, a BS may send a message to a MS that assigns one of a plurality of paging group IDs from the MS's neighborhood paging list 310 to be an anchor paging group ID for the mobile station. Assignment of anchor paging group ID by the BS or network may be based on load balancing, QoS (quality of service), service types, MS mobility or geographical location within the paging group area, etc., or other criteria/reasons. In another example, a MS's anchor paging group ID may be the paging group ID where MS enters in idle mode or perform location update.

Figure 4:
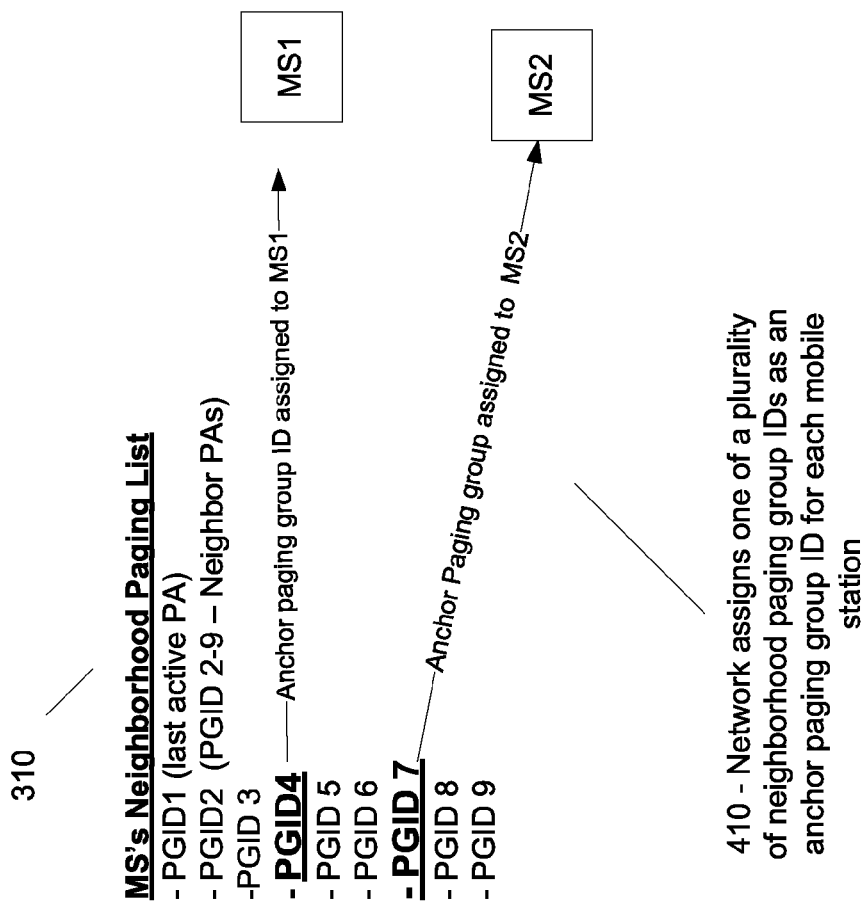
FIG. 4 is a diagram illustrating assignment of the anchor paging group ID according to an example embodiment.

FIG. 4 is a diagram illustrating assignment of the anchor paging group ID according to an example embodiment. As shown in FIG. 4, two example mobile stations (MS1, MS2) are illustrated, each located in paging area 1, and thus, both MS1 and MS2 may use the same neighborhood paging list 310 (shown in FIG. 4). For example, PGID4 from the neighborhood paging list may be assigned as the anchor paging group ID for MS1, and PGID7 is assigned as the anchor paging group ID for MS2.

According to an example embodiment, each of the anchor paging group IDs may be assigned to one or more MSs. Each anchor paging group ID may be associated with a different paging offset that identifies a location or resources of a paging message associated with the anchor paging group ID. In another example, each anchor paging group ID may be associated with a different paging offset that identifies a location or resources where paged MSs may perform network re-entry. Thus, different paging resource locations/times may be provided for each anchor paging group ID. For example, a paging message may be transmitted for a first anchor paging group ID (for MSs that belong to or have been assigned the first anchor paging group ID) via a first subframe or via a first subframe offset (e.g., 1 subframe from now), and a paging message may be transmitted for a second anchor paging group ID (for MSs that belong to or have been assigned the second anchor paging group ID) via a second subframe or a second subframe offset. Of course, in response to receiving a paging message that identifies the MS, the MS may perform network entry including performing a ranging procedure, e.g., by sending a ranging request with reason="response to page." By allocating a sub-set of MSs to different anchor paging groups, and offsetting the resources for paging messages (e.g., a different time to send the paging messages for each anchor paging group, this may distribute the paging burden across time, and may also decrease the probability of a collision via contention based access for a large group of MSs to transmit a ranging request, for example.

The anchor paging groups may also allow for an implementation of a two-step paging within a wireless network, which may decrease the paging processing burden placed on mobile stations. The first step may be based on the anchor paging group IDs listed in an anchor paging message, and the second step may be based on the MS's identity listed in the paging message.

For example, after an anchor paging group ID has been assigned to a MS, the MS may receive an anchor paging message that identifies one or more anchor paging groups for which there may be data for transmission (or to the MSs associated with the anchor paging group ID). For example, anchor paging group IDs may be listed in the anchor paging message to indicate that there may be data for DL (downlink) transmission to a MS (or one or more MSs) that belongs to or has been assigned the listed anchor paging group ID. Thus, a MS may compare its assigned anchor paging group ID to the list of anchor paging group IDs in the anchor paging message. If the MS's anchor paging group ID is found in the anchor paging message (a match), this indicates that the BS may have data for the MS (or other MSs that have been assigned that anchor paging group ID). This is the first step of the two step paging.

In the second step, if the MS's anchor paging group ID matches one of the paging group IDs of the anchor paging message, then the MS may then receive and decode the paging message for its anchor paging group ID, e.g., at the paging resources, time or location associated with this anchor paging group ID. For example, only those MSs having their anchor paging group ID listed in the anchor paging message need to decode their paging message. The other MSs (not having their anchor paging group ID in the anchor paging message), may return to the paging unavailable mode e.g., without decoding their paging messages, for example, to conserve power, since there is no data for transmission to such MSs. As noted, paging messages for each anchor paging group ID may use a different paging offset, or may provide paging messages at a different time or location, which may operate to distribute the paging load. If the paging message for the MS's anchor paging group ID identifies the MS (e.g., includes a MAC address, an MS paging identifier or other identifier that identifies the MS), then the MS may then typically perform network re-entry, e.g., by transitioning from idle state to active state, and then sending a ranging request to the BS, with reason="response to page." The MS may then receive the data from the BS, and then may return to idle state, for example.

Figure 5:
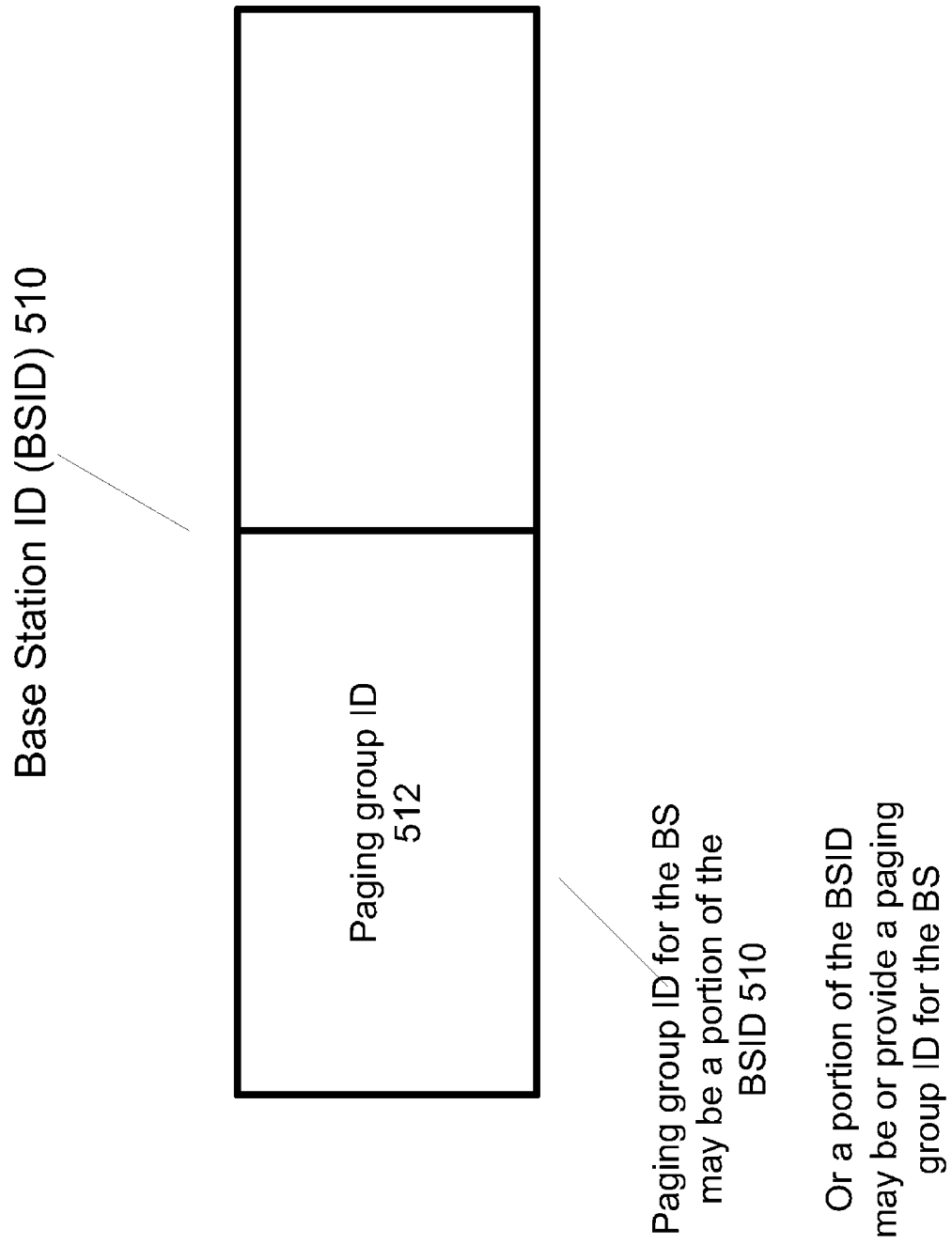
FIG. 5 is a diagram illustrating a BSID where a portion of the ID is a paging group ID for the base station.

FIG. 5 is a diagram illustrating a BSID where a portion of the ID provides or functions as a paging group ID for the base station. BSID/PGID combined identifier 510 may include a paging group ID (PGID) 512 provided as a first portion of the combined identifier 510 that identifies a paging group for a base station, and a base station ID 514 as a second portion of the combined identifier that identifies the base station. Thus, instead of separately transmitting a base station ID (BSID) and a paging group ID for the base station, these two identifiers may be combined into a single identifier, or the paging group ID may be embedded into a portion of the base station ID, for example. In this manner, resources may be conserved (and overhead reduced) by transmitting one identifier or value, instead of two, for example.

Therefore, according to an example embodiment, the BS may transmit a base station identifier (BSID) 510 that identifies the BS. According to an example embodiment, a portion of the BSID 510 may be or may provide a paging group ID that identifies a paging group for the BS. A first portion of the combined identifier including a base station ID (BSID) 512, and a second portion of the combined identifier may include a paging group ID (PGID) 514 that identifies a paging group for the base station. In another example embodiment, the BSID 510 may be divided into multiple parts (e.g., a PGID part, and a remaining BSID part) and transmitted at different times and with different periodicity. A mobile station may receive, from the base station, the BSID 510. The mobile station may compare at least the paging group ID portion 512 of the BSID 510 (or the entire BSID 510) to a neighborhood paging list 310. And, the mobile station may perform network re-entry or location update (e.g., by sending a ranging request with reason="location update") if the paging group ID portion 512 (or the BSID 510) does not match the neighborhood paging list 310.

In an example embodiment, a BSID may be six bytes long (48 bits). Also, the first, say, 24 bits of the BSID (or a portion of the BSID) may identify the operator ID and following 16 bits may identify the paging group ID 512. The entire 48 bits may identify the BSID, for example, and 16 bits of the 48 bits used for PGID as well, according to this example embodiment.

One specific example embodiment, may be where each paging group may include only one BS. Thus, in such case, the paging group ID may be the same as the BSID, for example. For example, the serving BS may transmit the list of neighbor paging group IDs (in this case, the neighbor paging group IDs are transmitted as a neighbor group of BSIDs) to corresponding MS during idle mode entry or location update. In this case, in another example embodiment, to further optimize the number of BSs in the list of neighbor BSIDS, to reduce signaling overhead, the neighbor list of BSIDs may only include BSs which are not part of neighbor advertisement message (e.g. MOB-NBR-ADV) (neighbor advertisement message—indicating neighbor BSs for the transmitting BS), which may be transmitted by the BS anyway, and thus, in some cases, may be eliminated (as redundant) in the transmitted list of neighbor BSIDs/paging group IDs. The receiving MS may automatically add the BSIDs in the MOB-NBR-ADV to its neighborhood paging list of PGIDs/BSIDs for paging area in addition to what MS receives from BS during Idle Mode entry. This reduces the need of broadcasting Paging Group IDs in the broadcast messages such as BCH (broadcast control channel), DCD, MOB-NBR-ADV, etc., since BSID may typically be broadcast by BS anyway. Additionally, BSIDs of a multi-sector BS may be done the same way, or may be the same, except a few (e.g. 2) LSB bits that represent sector ID may be provided or changed, so it can be used to further reduce overhead. MS detects whether it is out of the paging group area by checking received BSID. As noted, if BS finds the BSID is not in the MS's paging group BSID list (or the neighborhood paging list 310), the MS may perform location update, for example.

In the flow charts, some operations may be performed by processor (or controller) 1304 and/or wireless transceiver 1302, which are described below with reference to FIG. 13, as an example.

Figure 6:
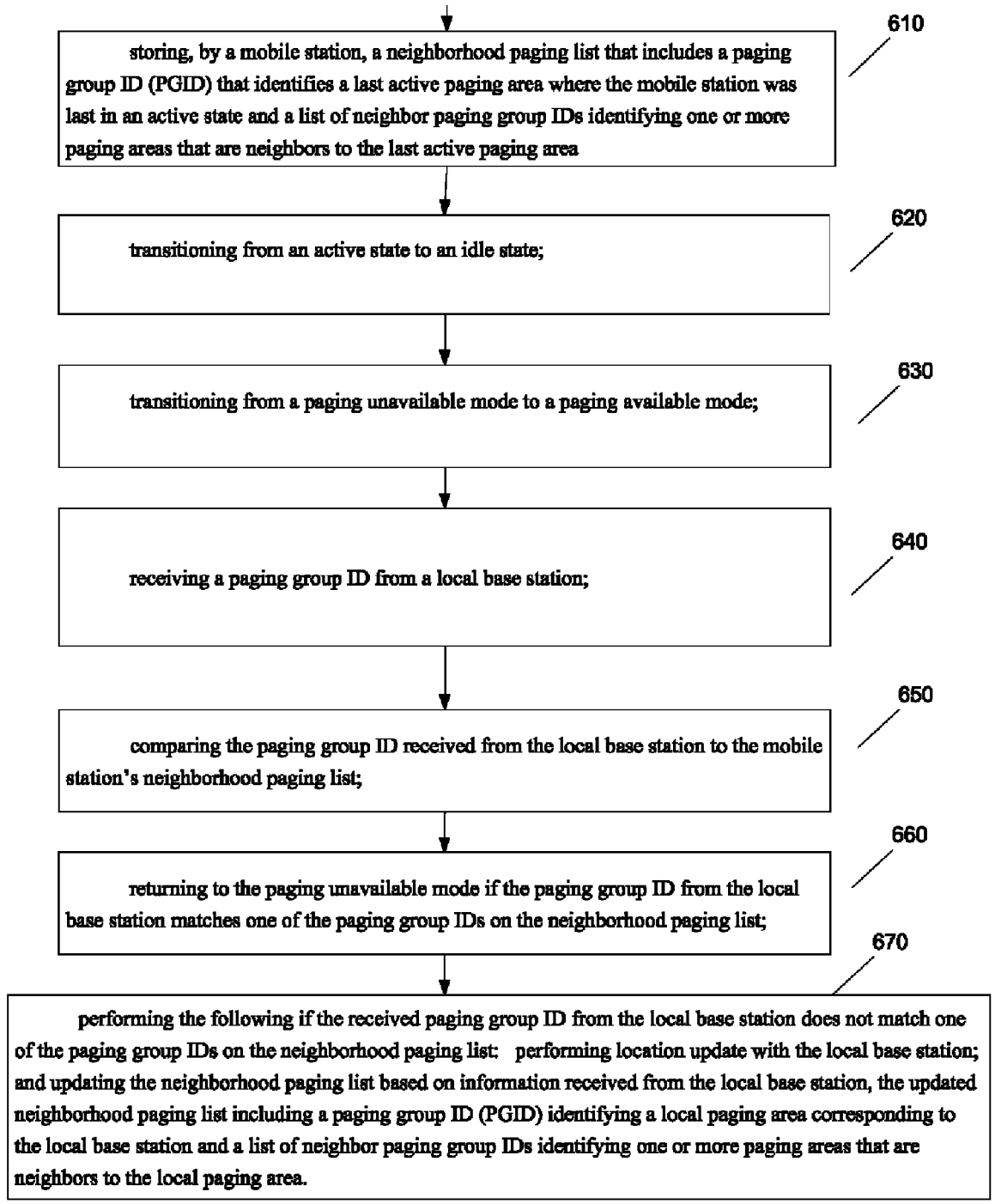
FIG. 6 is a flow chart illustrating operation of a mobile station according to an example embodiment.

FIG. 6 is a flow chart illustrating operation of a mobile station according to an example embodiment. Operation 610 includes storing (e.g., by processor/controller 1304), by a mobile station, a neighborhood paging list that includes a paging group ID (PGID) that identifies a last active paging area where the mobile station was last in an active state and a list of neighbor paging group IDs identifying one or more paging areas that are neighbors to the last active paging area. Operation 620 includes transitioning (e.g., by processor 1304) from an active state to an idle state. Operation 630 includes transitioning (e.g., by processor 1304) from a paging unavailable mode to a paging available mode. Operation 640 includes receiving (e.g., by processor 1304 and/or transceiver 1302) a paging group ID from a local base station. Operation 650 includes comparing (e.g., by processor 1304) the paging group ID received from the local base station to the mobile station's neighborhood paging list. Operation 660 includes returning (e.g., by processor 1304) to the paging unavailable mode if the paging group ID from the local base station matches one of the paging group IDs on the neighborhood paging list. Operation 670 includes performing (e.g., by processor 1304) the following if the received paging group ID from the local base station does not match one of the paging group IDs on the neighborhood paging list: performing location update with the local base station; and updating the neighborhood paging list based on information received from the local base station, the updated neighborhood paging list including a paging group ID (PGID) identifying a local paging area corresponding to the local base station and a list of neighbor paging group IDs identifying zero or more paging areas that are neighbors to the local paging area.

In the flow chart of FIG. 6, the storing operation 610 may include receiving, from the base station where the mobile station was last active, a paging group ID that identifies the last active paging area where the mobile station was last in an active state; receiving a list of neighbor paging group IDs from the base station that identify zero of more paging areas that are neighbors to the last paging area; and storing the neighborhood paging list that includes the paging group ID that identifies the last paging area where the mobile station was in an active state and the list of neighbor paging group IDs that identify neighbor paging areas to the last paging area.

Figure 7:
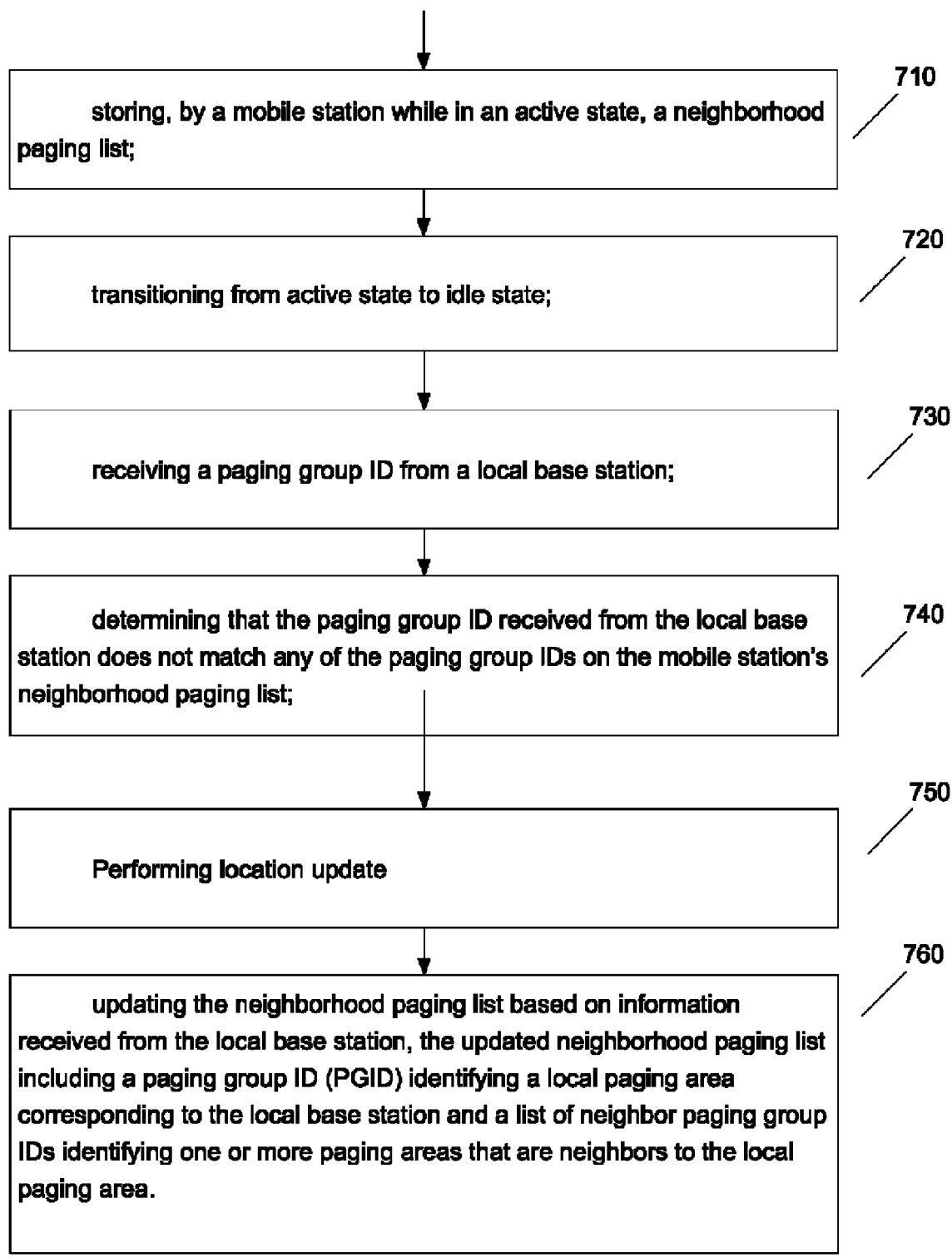
FIG. 7 is a flow chart illustrating operation of a mobile station according to another example embodiment.

FIG. 7 is a flow chart illustrating operation of a mobile station according to another example embodiment. Operation 710 may include storing (e.g., by processor 1304), by a mobile station while in an active state, a neighborhood paging list. Operation 720 may include transitioning from active state to idle state; Operation 730 may include receiving (e.g., by processor 1304 and/or transceiver 1302) a paging group ID from a local base station; Operation 740 may include determining (e.g., by processor 1304) that the paging group ID received from the local base station does not match any of the paging group IDs on the mobile station's neighborhood paging list; Operation 750 may include transitioning (e.g., by processor 1304) from idle state to active state and/performing location update; Operation 760 may include updating (e.g., by processor 1304 and/or transceiver 1302) the neighborhood paging list based on information received from the local base station, the updated neighborhood paging list including a paging group ID (PGID) identifying a local paging area corresponding to the local base station and a list of neighbor paging group IDs identifying one or more paging areas that are neighbors to the local paging area.

In the flow chart illustrated in FIG. 7, according to an example embodiment, a location, time or resources associated with anchor paging group ID may be derived or determined from a hashing algorithm based on the anchor paging group ID for the mobile station.

According to an example embodiment, a network entity, such as a paging controller or ASN gateway, may maintain a list of paging group IDs along with anchor paging group IDs for MSs that are in idle mode. When data is received that needs to be forwarded to an idle MS, the network entity will provide the list along with anchor PGID to all the BSs that are part of the paging group ID list. The BSs will transmit the paging messages at the location/time (or via resources) according to (or associated with) the anchor paging group ID.

Figure 8:
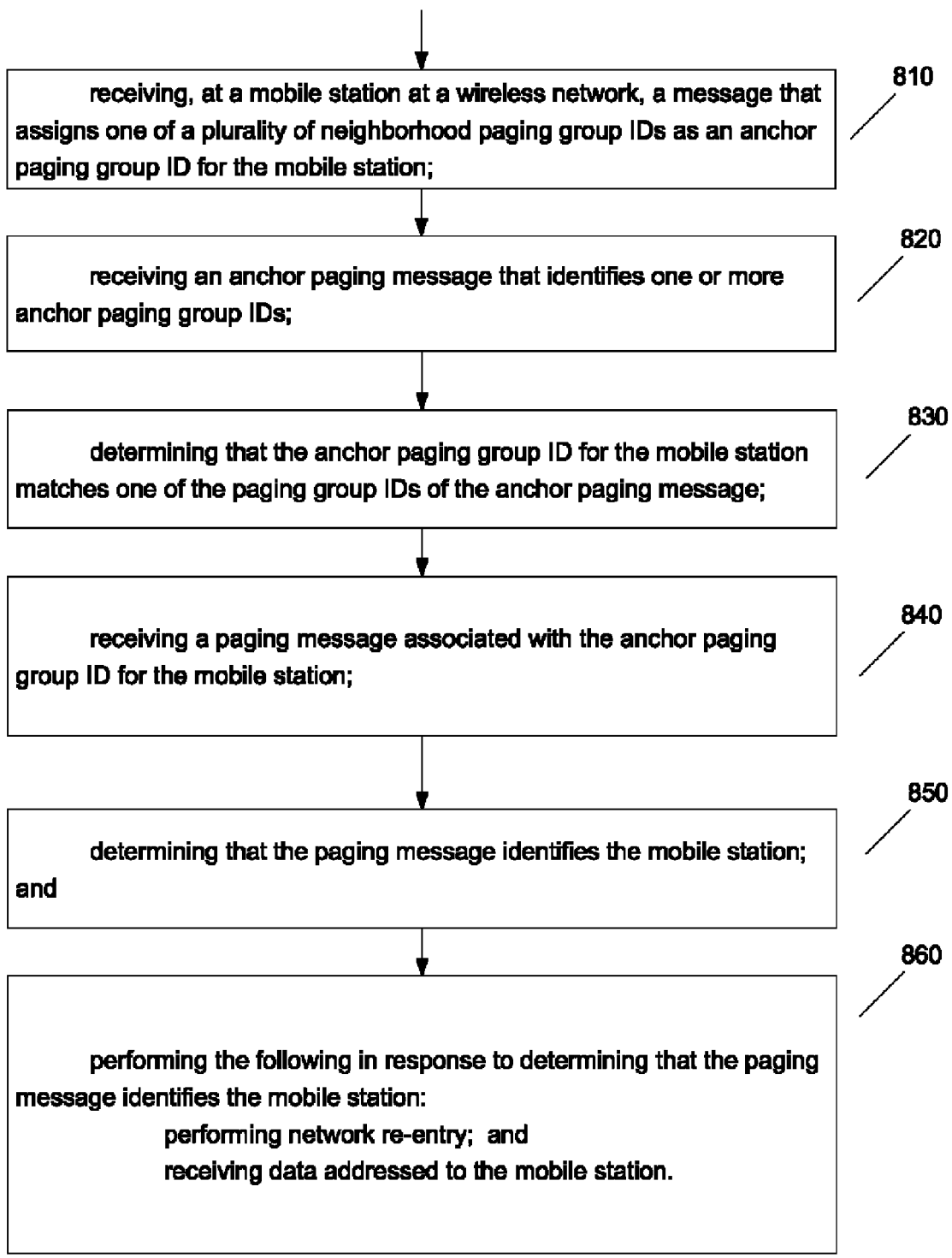
FIG. 8 is a flow chart illustrating operation of a mobile station according to another example embodiment.

FIG. 8 is a flow chart illustrating operation of a mobile station according to another example embodiment. FIG. 8 may illustrate, for example, a technique for performing a two-step paging in a wireless network. Operation 810 may include receiving, at a mobile station at a wireless network, a message that assigns one of a plurality of neighborhood paging group IDs as an anchor paging group ID for the mobile station; Operation 820 may include receiving (e.g., by processor 1304 and/or transceiver 1302) an anchor paging message that identifies one or more anchor paging group IDs; operation 830 may include determining (e.g., by processor 1304) that the anchor paging group ID for the mobile station matches one of the paging group IDs of the anchor paging message; operation 840 may include receiving (e.g., by processor 1304 and/or transceiver 1302) a paging message associated with the anchor paging group ID for the mobile station; operation 840 may include determining (e.g., by processor 1304) that the paging message identifies the mobile station; and operation 850 may include performing (e.g., by processor 1304 and/or transceiver 1302) the following in response to determining that the paging message identifies the mobile station: performing network re-entry; and receiving data addressed to the mobile station.

In the flow chart illustrated in FIG. 8, each anchor paging group ID is associated with a different paging offset or paging message location (e.g. based on hashing algorithm or hash of the PGID, for example) that identifies a location or resources of a paging message associated with the anchor paging group ID, wherein the receiving the paging message comprises receiving the paging message associated with the anchor paging group ID at a location or via resources associated with the anchor paging group ID.

In the flow chart of FIG. 8, a first anchor paging group ID may be associated with a first paging offset that identifies a first subframe for a paging message associated with the first anchor paging group ID and a second anchor paging group ID is associated with a second paging offset that identifies a second subframe for a paging message associated with the second anchor paging group ID.

In the flow chart of FIG. 8, the receiving an anchor paging message 820 may include receiving an anchor paging message, the anchor paging message identifying one or more anchor paging group IDs for which downlink data will be transmitted to one or more mobile station that are assigned to each anchor paging group ID identified in the anchor paging message.

Figure 9:
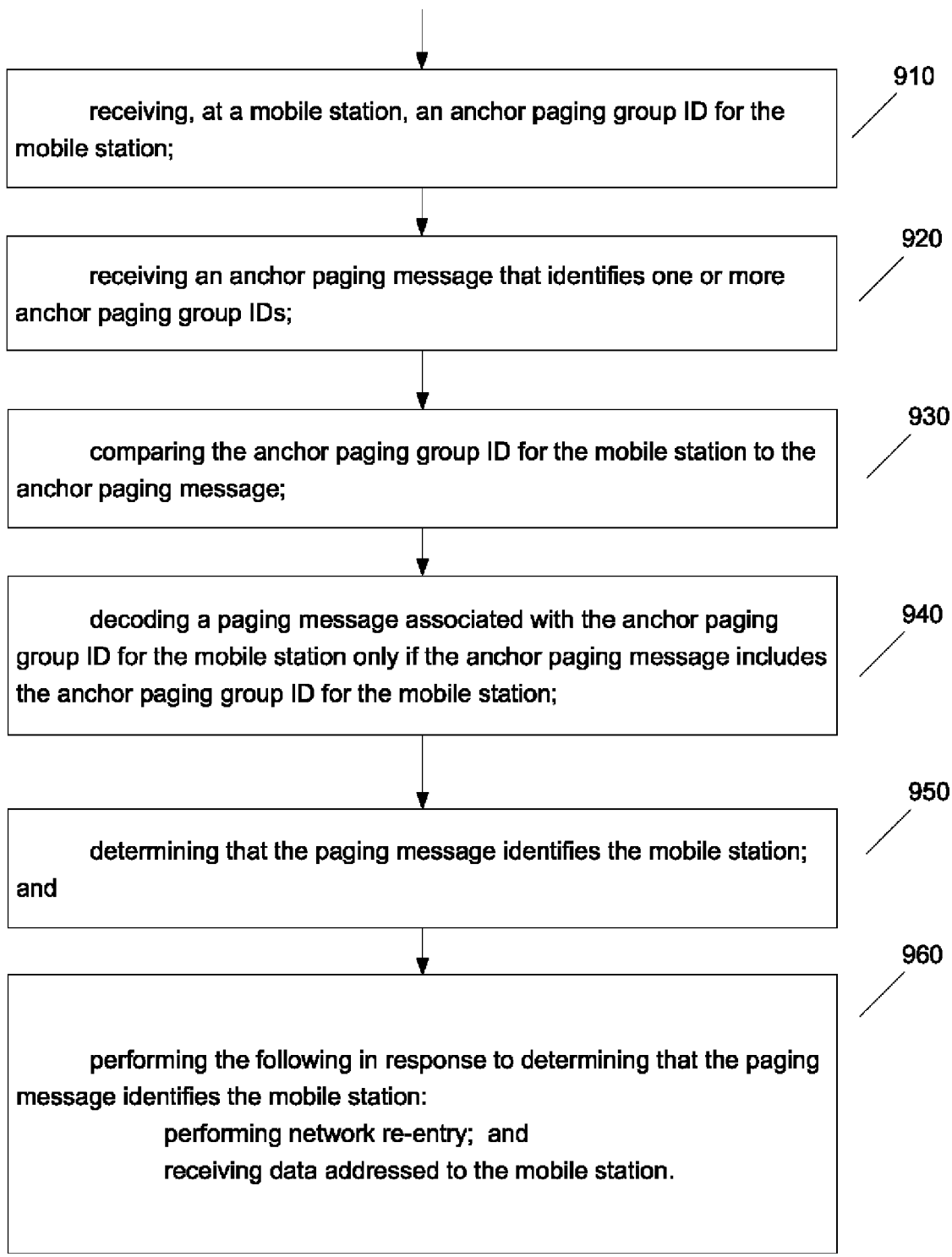
FIG. 9 is a flow chart illustrating operation a wireless node according to an example embodiment.

FIG. 9 is a flow chart illustrating operation a wireless node according to an example embodiment. The method in FIG. 9 may illustrate a method for performing a two-step paging in a wireless network. Operation 910 may include receiving (e.g., by processor 1304 and/or transceiver 1302), at a mobile station, an anchor paging group ID for the mobile station; Operation 920 may include receiving an anchor paging message that identifies one or more anchor paging group IDs; Operation 930 may include comparing (e.g., by processor 1304) the anchor paging group ID for the mobile station to the anchor paging message; operation 940 may include decoding (e.g., by processor 1304) a paging message associated with the anchor paging group ID for the mobile station only if the anchor paging message includes the anchor paging group ID for the mobile station; Operation 950 may include determining (e.g., by processor 1304) that the paging message identifies the mobile station; and Operation 960 may include performing (e.g., by processor 1304 and/or transceiver 1302) the following in response to determining that the paging message identifies the mobile station: performing network re-entry; and receiving data addressed to the mobile station.

In the method illustrated in FIG. 9, the determining operation 950 may include determining that a MS paging identifiers for the mobile station matches a MS paging identifier in the paging message. In another example embodiment of FIG. 9, each anchor paging group ID may be associated with a different paging offset that identifies a location or resources of a paging message associated with the anchor paging group ID, wherein the receiving the paging message comprises receiving the paging message associated with the anchor paging group ID at a location or via resources associated with the anchor paging group ID.

Figure 10:
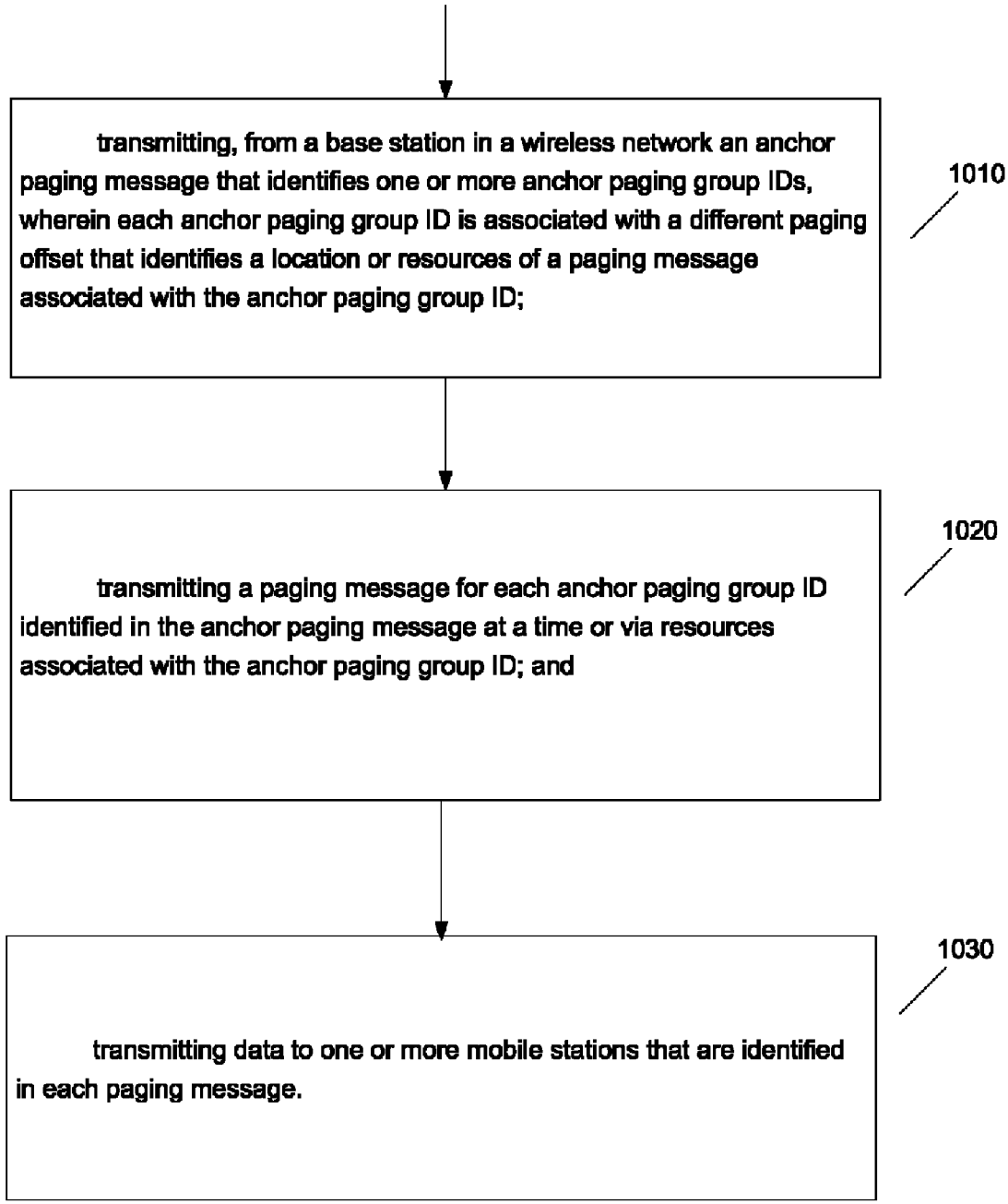
FIG. 10 is a flow chart illustrating operation of a base station according to an example embodiment.

FIG. 10 is a flow chart illustrating operation of a base station according to an example embodiment. Operation 1010 may include transmitting (e.g., by processor 1304 and/or transceiver 1302), from a base station in a wireless network an anchor paging message that identifies one or more anchor paging group IDs, wherein each anchor paging group ID is associated with a different paging offset that identifies a location or resources of a paging message associated with the anchor paging group ID; operation 1020 may include transmitting a paging message for each anchor paging group ID identified in the anchor paging message at a time or via resources associated with the anchor paging group ID; and Operation 1030 may include transmitting (e.g., by processor 1304 and/or transceiver 1302) data to one or more mobile stations that are identified in each paging message.

Figure 11:
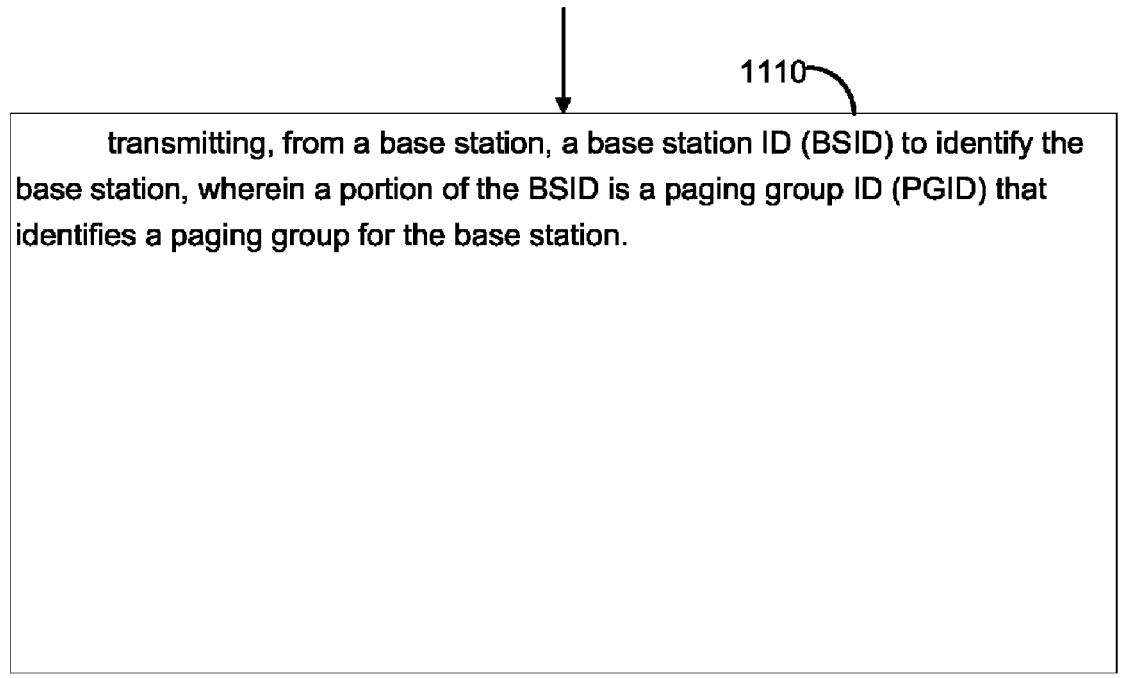
FIG. 11 is a flow chart illustrating operation of a base station according to another example embodiment.

FIG. 11 is a flow chart illustrating operation of a base station according to another example embodiment. Operation 1010 may include transmitting (e.g., by processor 1304 and/or transceiver 1302), from a base station, transmitting, from a base station, a base station ID (BSID) to identify the base station, wherein a portion of the BSID is or provides a paging group ID (PGID) that identifies a paging group for the base station.

Figure 12:
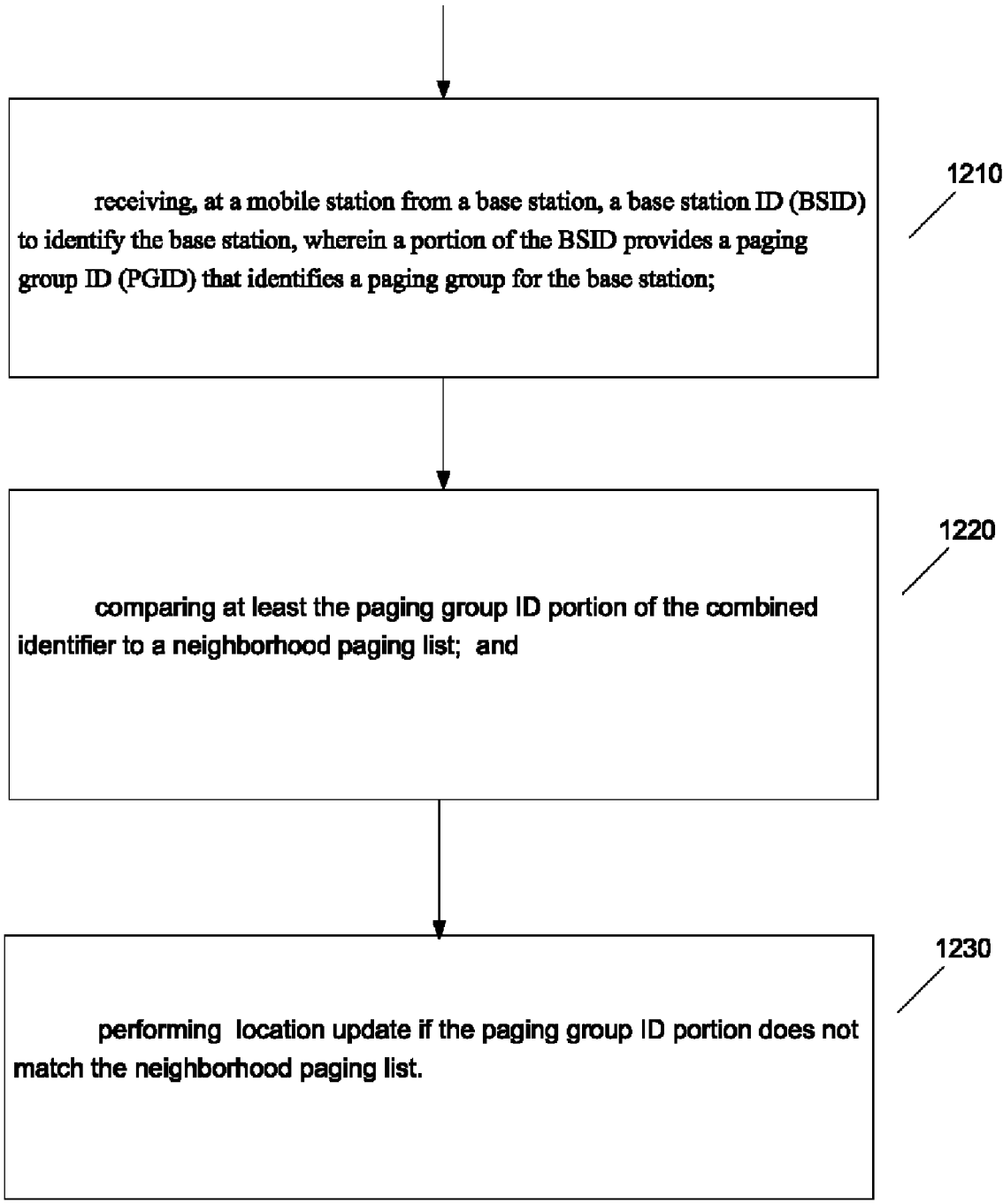
FIG. 12 is a flow chart illustrating operation of a mobile station according to another example embodiment.

FIG. 12 is a flow chart illustrating operation of a mobile station according to another example embodiment. Operation 1210 may include receiving (e.g., by processor 1304 and/or transceiver 1302), at a mobile station from a base station, a base station ID (BSID) to identify the base station, wherein a portion of the BSID is or provides a paging group ID (PGID) that identifies a paging group for the base station. Operation 1220 may include comparing (e.g., by processor 1304) at least the paging group ID portion of the BSID to a neighborhood paging list; and Operation 1230 may include performing (e.g., by processor 1304 and/or transceiver 1302) location update if the paging group ID portion does not match the neighborhood paging list.

In the flow chart of FIG. 12, the comparing operation 1220 may include comparing the BSID to a neighborhood BSID list, and wherein the performing operation 1230 may include performing a location update if the BSID does not match the neighborhood BSID list.

Figure 13:
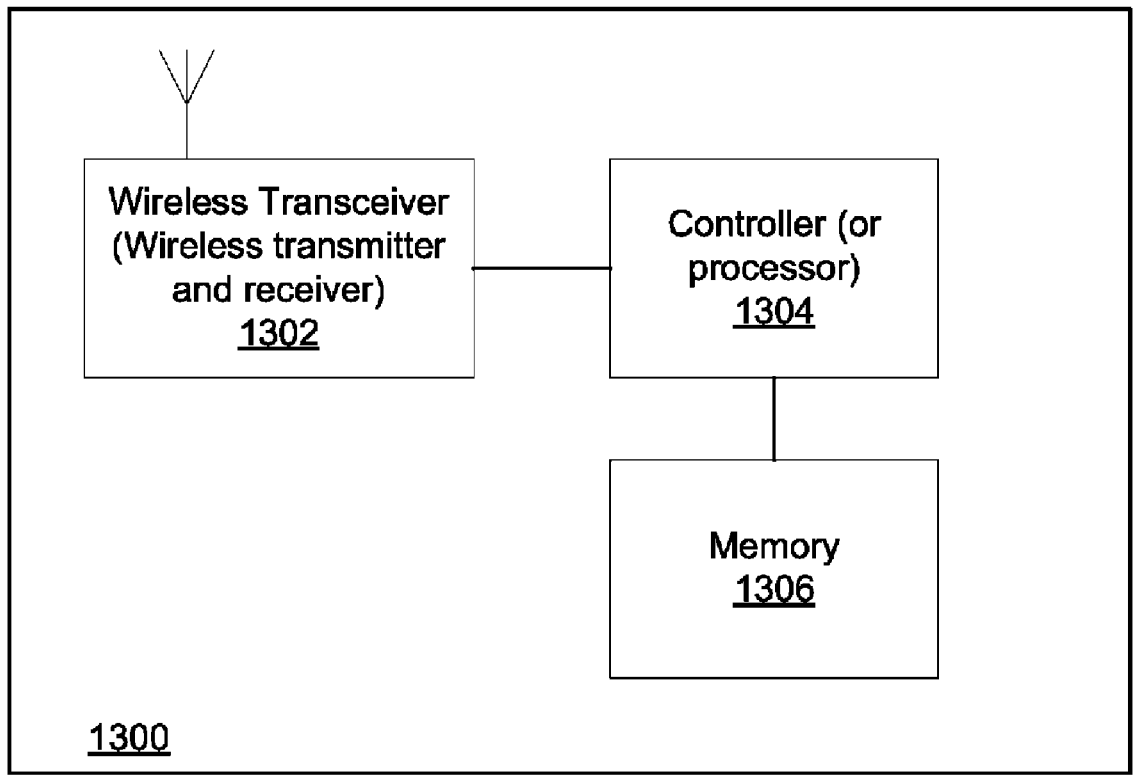
FIG. 13 is a block diagram of a wireless node according to an example embodiment.

FIG. 13 is a block diagram of a wireless station (or wireless node) 1300 according to an example embodiment. The wireless station 1300 (e.g. base station 104 or mobile node 106, 108, 110) may include, for example, a wireless transceiver (or wireless interface) 1302, including a transmitter to transmit signals and a receiver to receive signals, a controller (or processor) 1304 to control operation of the station and execute instructions or software, and a memory 1306 to store data and/or instructions. Controller (processor) 1304 may also make decisions or determinations, generate frames or messages for transmission, decode received frames or messages for further processing, and other tasks or functions described herein.

Controller (also known as processor) 1304 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 1304, or other controller or processor, performing one or more of the functions or tasks described above. An apparatus may include a processor and a wireless transceiver, and the apparatus may be configured to perform operations described herein.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors (or controllers, such as controller executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    storing, by a mobile station while in an active state, a neighborhood paging list;
    transitioning from active state to idle state;
    receiving a paging group ID from a local base station;
    determining that the paging group ID received from the local base station does not match any of the paging group IDs on the mobile station's neighborhood paging list; and
    updating the neighborhood paging list based on information received from the local base station, the updated neighborhood paging list including a paging group ID (PGID) identifying a local paging area corresponding to the local base station and a list of neighbor paging group IDs identifying one or more paging areas that are neighbors to the local paging area;
    wherein the storing is performed by the mobile station in response to the mobile station performing a network re-entry procedure with a base station where the mobile station was previously active; and
    wherein the storing comprises:
    receiving, from the base station where the mobile station was last active, a paging group ID that identifies the last active paging area where the mobile station was last in an active state;
    receiving a list of neighbor paging group IDs from the base station that identify one or more paging areas that are neighbors to the last paging area; and
    storing the neighborhood paging list that includes the paging group ID that identifies the last paging area where the mobile station was in an active state and the list of neighbor paging group IDs that identify neighbor paging areas to the last paging area.

2. The method of claim 1 wherein the storing is performed by the mobile station in response to the mobile station performing a location update procedure with a base station where the mobile station was previously active.

3. The method of claim 1 wherein the local base station transmits the paging group ID identifying a local paging area for the local base station, and transmits the neighbor paging group IDs identifying neighbor paging areas, wherein the paging group ID identifying a local paging area is transmitted more frequently than the neighbor paging group IDs identifying neighbor paging areas.

4. The method of claim 1 wherein one or more base stations belong to only one paging area and are assigned to or associated with only one PGID.

5. The method of claim 1 wherein the mobile station can be paged anywhere within paging areas identified by the neighborhood paging list.

6. The method of claim 1 wherein the receiving a paging group ID from a local base station is performed by the mobile station when the mobile station transitions from paging unavailable mode of the inactive state to a paging available mode of the inactive state.

7. The method of claim 1 and further comprising the mobile station receiving a message from the local base station that assigns one of a plurality of paging group IDs of the neighborhood paging list to be an anchor paging group ID for the mobile station, wherein the anchor paging group ID is associated with a paging offset that identifies a location or resources where paged mobile stations may perform network re-entry.

8. The method of claim 7 wherein each anchor paging group ID is associated with a different paging offset that identifies a location or resources where a mobile station (MS) may perform network re-entry by transmission of a ranging request message at a location or via resources associated with the anchor paging group ID.

9. An apparatus comprising a processor, the apparatus configured to:
    store, by a mobile station while in an active state, a neighborhood paging list;
    transition from active state to idle state;
    receive a paging group ID from a local base station;
    determine that the paging group ID received from the local base station does not match any of the paging group IDs on the mobile station's neighborhood paging list; and
    update the neighborhood paging list based on information received from the local base station, the updated neighborhood paging list including a paging group ID (PGID) identifying a local paging area corresponding to the local base station and a list of neighbor paging group IDs identifying one or more paging areas that are neighbors to the local paging area;
    wherein the apparatus being configured to store comprises the mobile station being configured to store the neighborhood paging list in response to the mobile station performing a network re-entry procedure with a base station where the mobile station was previously active; and
    wherein the apparatus being configured to store comprises the apparatus being configured to:
    receive, from the base station where the mobile station was last active, a paging group ID that identifies the last active paging area where the mobile station was last in an active state;

receive a list of neighbor paging group IDs from the base station that identify one of more paging areas that are neighbors to the last paging area; and store the neighborhood paging list that includes the paging group ID that identifies the last paging area where the mobile station was in an active state and the list of neighbor paging group IDs that identify neighbor paging areas to the last paging area.

10. The apparatus of claim 9 wherein the apparatus being configured to store comprises the mobile station being configured to store the neighborhood paging list in response to the mobile station performing a location update procedure with a base station where the mobile station was previously active.

11. The apparatus of claim 9 wherein the local base station is configured to transmit the paging group ID identifying a local paging area for the local base station, and is configured to transmit the neighbor paging group IDs identifying neighbor paging areas, wherein the paging group ID identifying a local paging area is transmitted more frequently than the neighbor paging group IDs identifying the neighbor paging areas.

12. The apparatus of claim 9 wherein one or more base stations belong to only one paging area and are assigned to or associated with only one PGID.

13. The apparatus of claim 9 wherein the apparatus being configured to receive a paging group ID from a local base station is performed by the mobile station when the mobile station transitions from paging unavailable mode of the inactive state to a paging available mode of the inactive state.

14. The apparatus of claim 9 wherein the apparatus being further configured to receive, by the mobile station, a message from the local base station that assigns one of a plurality of paging group IDs of the neighborhood paging list to be an anchor paging group ID for the mobile station, wherein the anchor paging group ID is associated with a paging offset that identifies a location or resources where paged mobile stations may perform network re-entry.

* * * * *

UNITED STATES PATENT AND TRADEMARK OFFICE
CERTIFICATE OF CORRECTION

| | |
|---|---|
| PATENT NO. | : 8,374,625 B2 |
| APPLICATION NO. | : 12/555926 |
| DATED | : February 12, 2013 |
| INVENTOR(S) | : Xiaoyi Wang et al. |

It is certified that error appears in the above-identified patent and that said Letters Patent is hereby corrected as shown below:

In the Claims:

In column 17, line 63, in claim 1, delete "of" and insert -- or --, therefor.

In column 19, line 2, in claim 9, delete "of" and insert -- or --, therefor.

Signed and Sealed this
Fourteenth Day of May, 2013

Teresa Stanek Rea
*Acting Director of the United States Patent and Trademark Office*